Sept. 16, 1952 W. A. HONEYCUTT 2,610,436
APPARATUS FOR MAKING TUFTED WORK
Filed March 5, 1951 5 Sheets-Sheet 1

INVENTOR
WALTER A. HONEYCUTT

BY

ATTORNEY

Sept. 16, 1952  W. A. HONEYCUTT  2,610,436
APPARATUS FOR MAKING TUFTED WORK
Filed March 5, 1951  5 Sheets-Sheet 2

INVENTOR
WALTER A. HONEYCUTT
BY
ATTORNEY

Sept. 16, 1952 W. A. HONEYCUTT 2,610,436
APPARATUS FOR MAKING TUFTED WORK
Filed March 5, 1951 5 Sheets-Sheet 4

INVENTOR
WALTER A. HONEYCUTT
BY
ATTORNEY

Sept. 16, 1952  W. A. HONEYCUTT  2,610,436
APPARATUS FOR MAKING TUFTED WORK
Filed March 5, 1951  5 Sheets-Sheet 5

INVENTOR
WALTER A. HONEYCUTT

BY
ATTORNEY

Patented Sept. 16, 1952

2,610,436

UNITED STATES PATENT OFFICE 2,610,436

APPARATUS FOR MAKING TUFTED WORK

Walter A. Honeycutt, Washington, D. C.

Application March 5, 1951, Serial No. 213,907

4 Claims. (Cl. 45—138)

My invention relates to an apparatus for making tufted cushions or work for furniture and the like.

An important object of the invention is to provide an apparatus which greatly reduces the labor required to form the tufting, and which produces the product in a reliable and uniform manner.

A further object of the invention is to provide apparatus of the above-mentioned character which is relatively simple in construction, cheap to manufacture, easy to operate, and adjustable to vary the size and shape of the tufts.

Other objects and advantages of the invention will be apparent during the course of the following description.

In the accompanying drawings forming a part of this application, and in which like numerals are employed to designate like parts throughout same.

In the drawings, where for the purpose of illustration is shown a preferred embodiment of the apparatus embodying my invention, the numeral 25 designates generally the apparatus for forming tufted cushions, or the like. The apparatus 25 comprises a plurality of vertical legs or posts 26, arranged in equidistantly spaced parallel rows forming an over-all rectangular group, and small rectangular groups within the over-all group, Figure 1. As shown in the drawings, each row comprises four of the legs 26, and the legs of each row are arranged opposite corresponding legs in the next adjacent row, so that longitudinal and transverse rows of legs are formed in the over-all rectangular group. Four of the legs 26 define the four corners of the apparatus, as shown. It should be understood that the apparatus may contain any desired number of rows of legs 26, and each row may contain any desired number of the legs, the arrangement shown in the drawings being merely illustrative of the invention. When a greater number of rows of legs 26 is employed in the apparatus, its over-all size is increased, and a larger area of work may be tufted by the apparatus. Accordingly, when a lesser number of rows of legs 26 make up the apparatus, its over-all size is smaller, and a smaller area of the tufted work is produced.

Figure 5:
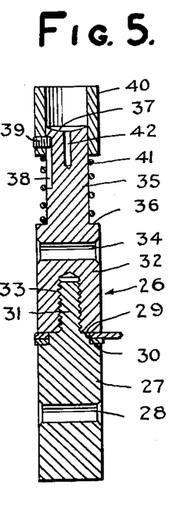
Figure 5 is a central vertical longitudinal section taken on line 5—5 of Figure 4.

Each leg or post 26 comprises a lower section or bar 27 having a transverse opening 28 near its longitudinal center, and provided at its upper end with a short reduced extension 29 forming a flat annular shoulder 30. Each reduced extension 29 carries a further reduced vertical screw-threaded extension 31, integral therewith, and projecting above the extension 29. The shoulders 30 and the tops of the extensions 29 of all legs 26 are arranged at the same elevation, and the over-all length of all legs 26 is equal. Each leg 26 further comprises an upper section or bar 32, provided in its lower end with a screw-threaded opening 33, receiving the upstanding screw-threaded extension 31, and each bar 32 is provided near its longitudinal center with a transverse opening 34, like the opening 28. The openings 28 and 34 are adapted to receive a suitable rod, serving as a wrench to aid in assembling and disassembling the upper and lower sections of the legs 26. Each upper section 32 includes an upper reduced portion 35, integral therewith and forming a flat annular shoulder 36 near the longitudinal center of the upper section 32. The top end of the portion 35 has a shallow concave recess 37, for a purpose to be described, and the reduced portion 35 is provided with a side longitudinal groove or keyway 38, slidably receiving a radial pin or set screw 39, carried by a vertically shiftable cylindrical sleeve 40, slidably mounted upon the reduced portion 35. A compressible coil spring 41 surrounds each reduced portion 35 and has its upper end engaging the lower end of the sleeve 40 and its lower end seated against the shoulder 36. The springs 41 hold the sleeves 40 in their uppermost or elevated positions, in which positions the upper ends of the sleeves project above the upper ends of the extensions 35, as shown. The upper ends of all of the sleeves 40 are at the same elevation. The lower end of each bar 32 engages the upper end of a reduced extension 29, and is held spaced from the shoulder 30 for forming an annular groove or passage of fixed width, Figure 5. The upper end of each portion 35 is provided with a small central vertical bore 42, forming a socket for a purpose to be described.

The rows of legs 26 are connected by equidistantly spaced horizontal parallel rows A, B, C and D of adjustable links or plates extending between opposite sides of the apparatus 25, and also by similar rows A', B', C' and D' of adjustable links, arranged at right angles to and crossing the rows A, B, C and D. All of the rows of links are arranged adjacent to the shoulders 30 and reduced extensions 29, and therefore are at the same elevation. The rows A and D and A' and D' define the marginal edges of the rectangular apparatus, as shown.

Figure 1:
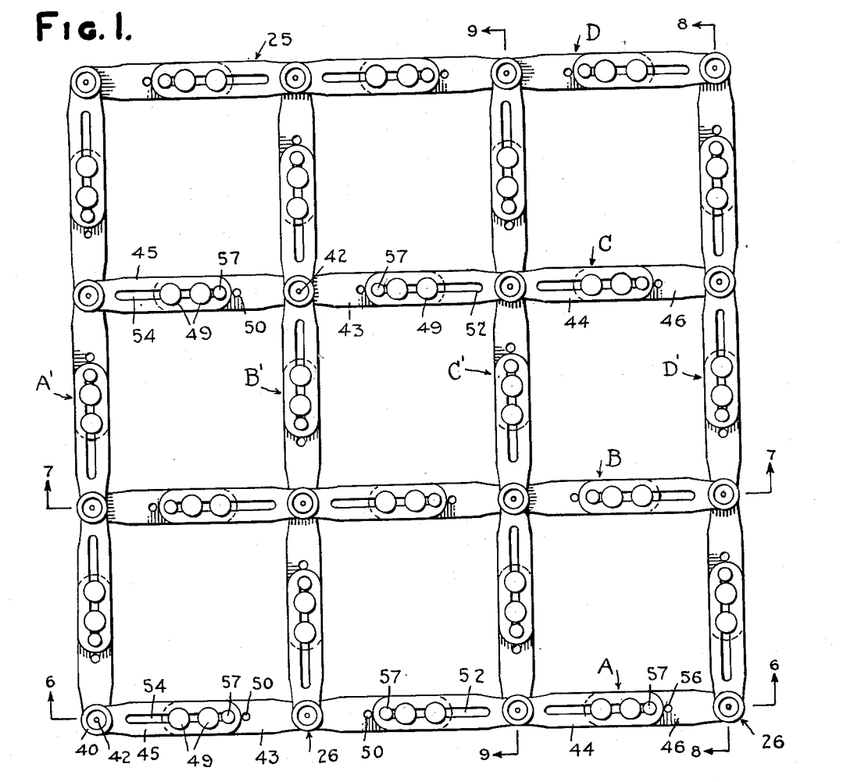
Figure 1 is a plan view of my apparatus in an open or distended position.
Figure 2:
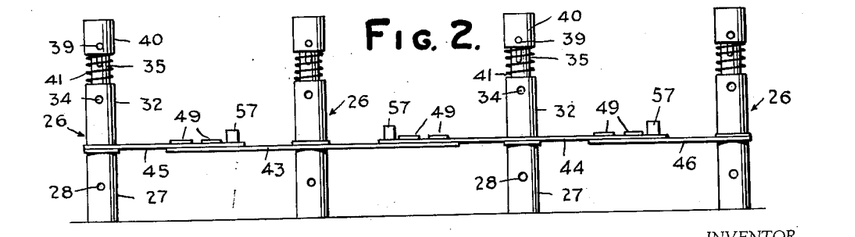
Figure 2 is a side elevation of the same.
Figure 6:
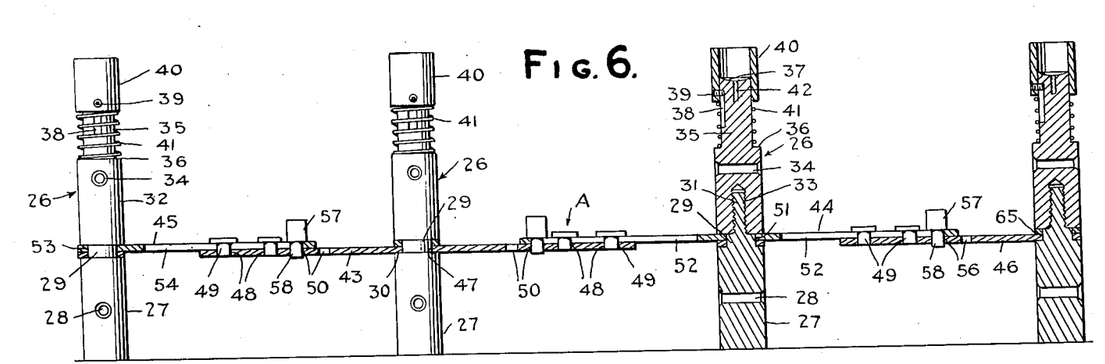
Figure 6 is an enlarged vertical section taken on line 6—6 of Figure 1.

The horizontal row A of links, carried by one outermost row of legs 26 comprises first and second double links 43 and 44, and single end links 45 and 46, Figures 1 and 6. The links 43, 44, 45 and 46 extend in longitudinal relation to form the row A, and the double link 43 is provided at its longitudinal center with an opening 47, pivotally receiving the reduced extension 29 of one intermediate leg 26 of the adjacent row of legs. The double link 43 rests upon the shoulder 30 of the intermediate leg 26, as shown. The double link 43 extends equidistantly longitudinally upon opposite sides of the intermediate leg carrying it. The double link 43 is provided near its opposite ends and at its transverse center with longitudinally spaced pairs of spaced openings 48, having headed guide pins 49 rigidly secured therein, with the heads of the guide pins spaced above the top surface of the double link 43. The double link 43 is further provided longitudinally inwardly of the pairs of guide pins 49 with longitudinally spaced pairs of spaced openings 50, for a purpose to be described. The double link 44 is provided at its longitudinal center with an opening 51, pivotally receiving the reduced extension 29 of the other intermediate leg 26, and the double link 44 extends equidistantly longitudinally upon opposite sides of the last mentioned leg 26, and has one end portion arranged in overlapping sliding contact with the adjacent end portion of the double link 43, Figure 6. The double link 44 is provided upon opposite sides of its supporting leg 26, and at its transverse center with longitudinal slots 52 of equal length, and extending throughout the major portion of the length of the double link 44, upon opposite sides of its supporting leg 26. One slot 52 slidably receives one pair of the guide pins 49 carried by the double link 43, and the heads of these guide pins slidably contact the upper face of the double link 44. The arrangement is such that the double links 43 and 44 may be adjusted longitudinally of each other but cannot assume an angular relationship, due to the spacing of the pair of guide pins 49 connecting them.

The single end link 45 is provided near its outer end with an opening 53, pivotally receiving the reduced extension 29 of the adjacent corner leg 26, and the single link 45 extends beyond the inner side of the corner leg 26 and is arranged above the double link 43 in overlapping or superposed relation, Figure 6. The end link 45 slidably contacts the double link 43, and is arranged at the same elevation in the row A as the double link 44, Figure 6. The link 45 has a longitudinal slot 54, identical with the slots 52, and slidably receiving the other pair of guide pins 49 of the double link 43. The heads of these guide pins slidably contact the upper face of the single link 45. The guide pins 49 permit of longitudinal adjustment of the links 43 and 45, but hold the same against angular movement.

The single link 46 is provided near its outer end with an opening 55, pivotally receiving the reduced extension 29 of the adjacent corner leg 26, and the link 46 extends beyond the inner side of the corner leg 26, and beneath the adjacent end portion of the double link 44 in sliding contacting relation. The single link 46 carries a longitudinally spaced pair of the headed guide pins 49 near its inner end, and rigidly secured thereto in the same manner that the other pairs of guide pins 49 are secured to the double link 43. The guide pins 49 of the single link 46 slidably engage within the other slot 52 of the double link 44, with their heads slidably contacting the upper face of the double link 44. The single link 46 is further provided, longitudinally outwardly of the guide pins 49 with a pair of longitudinally spaced openings 56, identical with the openings 50 in size, spacing and arrangement, and the openings 56 are adapted to be brought into registration with the adjacent slot 52 of the double link 44. The openings 50 of the double link 43 are likewise adapted to be brought into registration with the slot 54 of the single link 45 and the other slot 52, Figure 6. When one or more of the openings 50 and 56 register with the slots 52 and 54, removable locking pins 57 may have their reduced shanks 58 inserted downwardly through the slots and openings for releasably locking the links of the row A in selected longitudinally adjusted positions. If the removable locking pins 57 are omitted, the row A of links may be extended or opened longitudinally until the guide pins 49 engage the ends of the slots 52 and 54, and this provides for the maximum extension of the row A. The arrangement provides three possible adjustments for the length of the row A, one adjustment for each opening 50 and 56, and the maximum adjustment when the pins 57 are omitted. Three of the removable pins 57 are required for positively locking the links of the row A in their selected adjusted positions, as shown. It should be understood that additional adjusting openings 50 and 56 may be provided in the links 43 and 46, if desired, and the adjusting openings and the pins 57 may be omitted entirely, if desired. The links 43, 44, 45 and 46 are flat.

Figure 7:
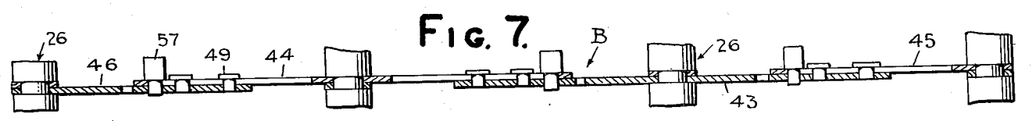
Figure 7 is a similar section taken on line 7—7 of Figure 1.
Figure 8:
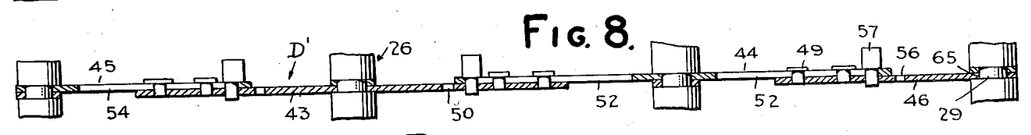
Figure 8 is a vertical section taken on line 8—8 of Figure 1.
Figure 9:
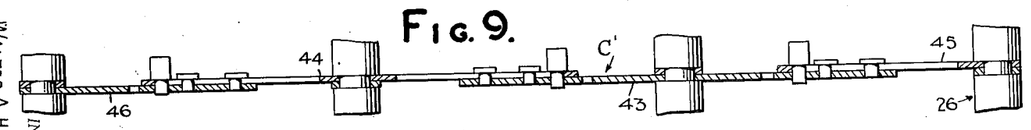
Figure 9 is a similar section taken on line 9—9 of Figure 1.

The horizontal row B of links comprises the same links 43, 44, 45 and 46 making up the row A, but the arrangement of the links in the row B is different, the row B being produced if the row A is bodily reversed end-for-end, without inverting the same. The double link 44 in the row B is mounted upon the other intermediate leg 26, as compared to the one supporting the double link 43 of the row A. The same is true of the double link 44, Figure 7. The double link 44 of the row B is arranged above the double link 43 and this arrangement is the same as in the row A. In the row B, the single or end link 45 is arranged at the opposite end of the row from its position in the row A, and its opening 53 receives the reduced extension 29 of the opposite end leg 26. As in the row A, the single link 45 in the row B is arranged above the double link 43. The other single link 46 of the row B is likewise reversed end-for-end from its position in the row A, and its opening 55 receives the reduced extension 29 of the opposite end leg 26. The single link 46 of the row B is arranged beneath the double link 44, as in the row A. The arrangement is such that if the row A of links is turned or reversed end-for-end, without inverting the parts, the row B is produced, as previously stated.

In the row A, the links 43 and 46 are seated directly upon the shoulders 30 of the legs 26, and the links 44 and 45 are spaced above the shoulders 30 in sliding contact with the lower ends of the bars 32. The links of the row B adjacent to corresponding legs 26 of that row are staggered vertically with respect to the links in the row A, so that a link in the row B directly opposite one in the row A which is seated upon a shoulder 30 is spaced above the shoulder 30 of the corresponding leg 26 in the row B. This alternating or staggered arrangement with respect to the vertical is repeated in the rows C and D, and there is no progressive piling up of the various links in the rows A through D. The individual links 43, 44, 45 and 46 of all of the rows A, B, C and D are identical in construction and interchangeable, except as to their arrangement in the rows, as described.

The row C of links is identical in construction and arrangement with the row A, and the row C is produced if the row B is turned end-for-end without inverting the parts. The links of the row C have the same location with respect to the horizontal shoulders 30 as the corresponding links in the row A, and are staggered vertically with respect to the shoulders 30, as compared with links disposed laterally opposite them in the row B.

The row D is identical in construction and arrangement with the row B, and if the row C is turned end-for-end without inverting the same, the row D will be produced. The same vertical staggered relationship between opposite links of the rows C and D exists, as previously described in connection with the rows A and B.

The horizontal row A″ of links is identical in construction and arrangement with the row A when the apparatus is viewed from the left hand side of Figure 1, and the rows A′, B′, C′ and D′ are arranged at right angles to the rows A, B, C and D and cross the same. The row A′ comprises the identical links 43, 44, 45 and 46 making up the row A and the links in the row A′ are pivotally connected with the legs 26 in the same manner described in connection with the row A. The row B′ is identical with the row B, and the rows C′ and D′ are identical with the rows C and D. Likewise, the row C′ is identical with the row A′, and the row D′ is identical with the row B′. The vertically staggered relationship existing between laterally opposed links in the rows A through D also exists between the laterally opposed links of the rows A″ through D′. It should be understood that the removable adjusting pins 57 described in connection with the rows A, B, C and D are employed in the same manner in the rows A′, B′, C′ and D′, and the latter rows operate in the same manner as the rows A, B, C and D to extend and collapse the apparatus 25 in the direction at right angles to the rows A, B, C and D.

The use of the apparatus in the practice of the first form of the method is as follows:

The apparatus 25 is initially opened up or extended as shown in Figure 1. The legs 26 of the rows A and D are grasped and pulled apart for extending or lengthening the rows A′, B′, C′ and D′, and this extends the apparatus in one direction, or longitudinally of the rows A′, B′, C′ and D′. When the locking pins 57 are employed in each row A′, B′, C′ and D′, and arranged in corresponding ones of the openings 50 and 56, the extent of opening of the apparatus may be adjusted, as previously described in connection with the row A. If the pins 57 are not used, the rows A′, B′, C′ and D′ are lengthened to the maximum possible extent, and the guide pins 49 engage the ends of the slots 52 and 54 and limit the opening or extending of the apparatus in one direction. The spacing between the legs 26 in the rows A′, B′, C′ and D′ is equal for all selected longitudinally adjusted positions of these rows, because the slots 52 and 54 are of equal length. Accordingly, the rows A, B, C and D remain equidistantly spaced laterally and parallel, in all selected adjusted positions of the rows A′, B′, C′ and D′.

The apparatus 25 is next extended longitudinally of the rows A, B, C and D by grasping the legs 26 in the outermost rows A′ and D′, and pulling them apart. Again, the removable locking pins 57 may be employed, if desired, to adjust or limit the extension of the apparatus longitudinally of the rows A, B, C and D. With the apparatus thus extended in both directions, it may assume the extended or open rectangular position shown in Figure 1. While in this position, upholstery pins 59 are mounted upon the upper ends of the reduced portions 35, within the sleeves 40, and with their rounded fabric-covered heads or buttons 60 seated in the concave recesses 37, Figure 10. The upholstery pins 59 are upwardly directed as shown, and their points project above the upper ends of the sleeves 40, when the sleeves are in their elevated positions.

Figure 10:
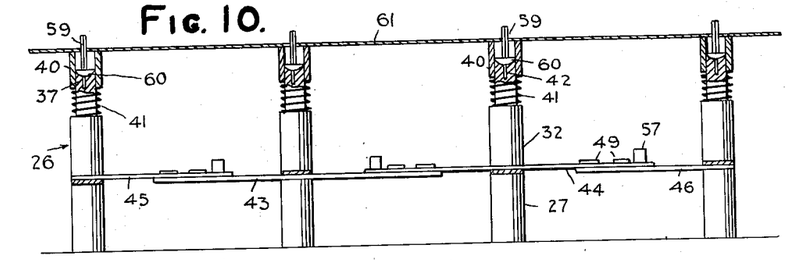
Figure 10 is a vertical section similar to Figure 6, and showing the use of the apparatus during a first step in the practice of a preferred form of the method.

An outer flexible sheet 61 of fabric, leather, plastics or the like is now spread over the apparatus in a horizontal substantially flat or distended condition, and the points of the upholstery pins 59 may penetrate the outer sheet 61 as shown in Figure 10. If the outer sheet 61 is too tough, as when formed of leather or the like, it may be provided with a plurality of small slits 62, at the points of the upholstery pins 59, to facilitate the passage of the pins through the sheets.

Figure 3:
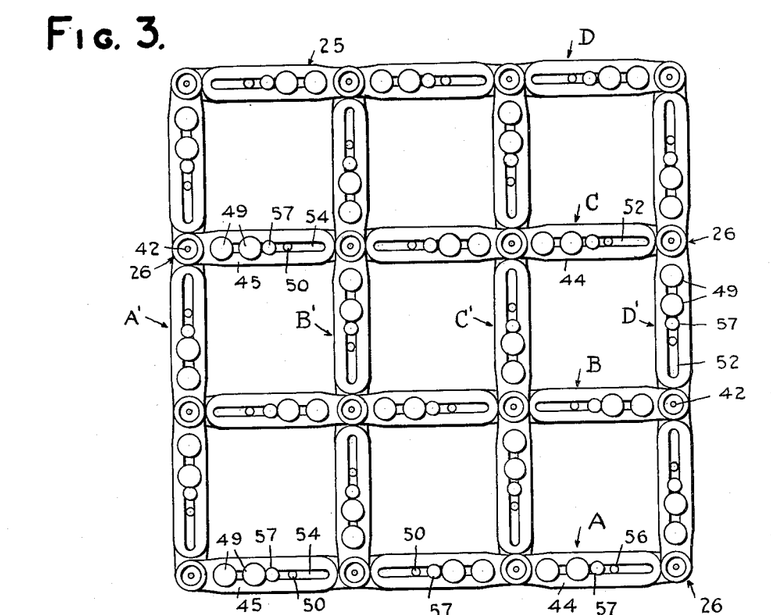
Figure 3 is a plan view of the apparatus in the closed or collapsed position.
Figure 4:
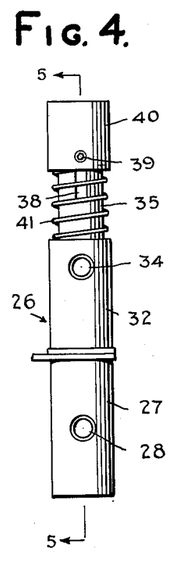
Figure 4 is an enlarged side elevation of a leg of the apparatus, and associated elements.

When the pins 59 have penetrated the outer sheet 61, the apparatus 25 is collapsed or closed in both directions, longitudinally of the rows A, B, C and D, and longitudinally of the rows A', B', C' and D'. The guide pins 49 engage the other ends of the slots 52 and 54 and constitute stops limiting the inward or closing movement of the apparatus, which will now assume the condition shown in Figure 3. The several rows of links are still equidistantly spaced and parallel but there is substantially less space between all of the rows. The rows of legs 26 form individual rectangular groups within the over-all group, as previously stated, and each individual group of four legs 26 carries four of the upholstery pins 59. When the individual groups of legs are shifted inwardly, as the apparatus is collapsed, the upholstery pins 59 holding the outer sheet 61 cause the sheet to develop a fullness or to sag within each group of four legs 26. This sagging of the outer sheet 61 within the groups of legs forms depending cells or pockets 63, Figure 11. The depth of each cell 63 and its marginal size or area is determined by the extent of retraction or closing of the groups of legs in the apparatus, which extent can be varied as desired.

The cells or pockets 63 are next filled with suitable filling material such as cotton, hair, foam rubber or the like, and the cells may be filled individually or in groups, or a single layer of filling may be arranged over all of the cells 63 simultaneously. The filling may be introduced into the cells in any desired or preferred manner. The filled cells 63 remain connected and are held by the apparatus against movement.

Figure 11:
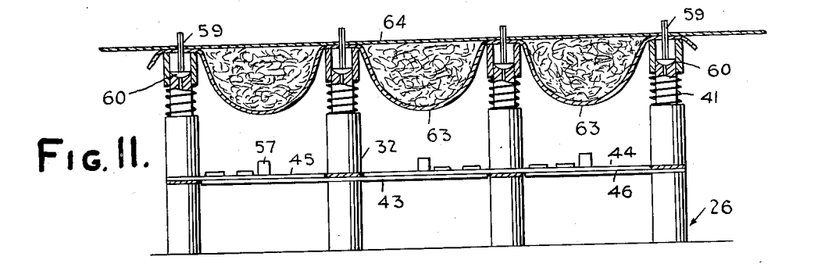
Figure 11 is a similar sectional view through the apparatus and work and illustrating a further step during the practice of the first form of the method.
Figure 12:
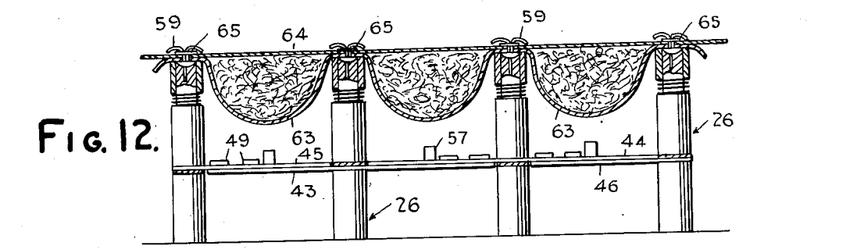
Figure 12 is a similar sectional view of the apparatus and work, and showing a still further step in the practice of the first form of the method.
Figure 13:
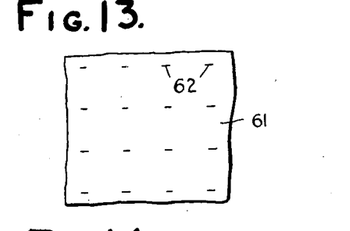
Figure 13 is a fragmentary plan view, partly diagrammatic, of an outer flexible sheet in the flat or distended condition after being pierced at spaced points for forming small slits in the same.
Figure 14:
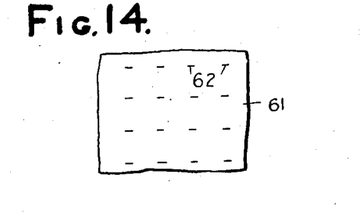
Figure 14 is a similar view of the outer sheet after the apparatus is collapsed for forming pockets or cells in the outer sheet.
Figure 15:
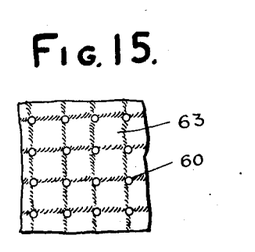
Figure 15 is a similar view of the outer sheet after upholstery pins are secured in place and the completed work is removed from the apparatus.
Figure 16:
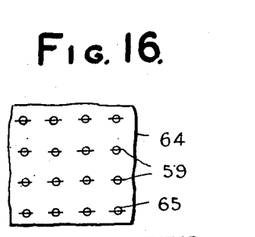
Figure 16 is a similar view showing the rear face of a backing sheet after the arms of the upholstery pins are spread apart.

A flexible backing sheet 64 of fabric or the like is now placed over the outer sheet 61, and the backing sheet is substantially flat or distended, Figure 11. The sleeves 40 are now depressed and assume their lowered positions, Figure 12, and the upholstery pins 59 pass through the backing sheet 64, and the heads or buttons 60 move into contact with the outer sheet 61 at the corners of the cells 63. The backing sheet 64 is held in close relation or contact with the outer sheet 63 during this operation. A washer 65 may now be applied to each upholstery pin 59, rearwardly of the backing sheet 64, and the arms of the upholstery pins are spread apart so that the washers draw the outer and backing sheets together as shown in Figure 12. Each head or button 60 is covered with the material of the outer sheet 63, as is well known. The cells 63 now constitute the tufts having the buttons 60 secured in place at the four corners of the tufts, Figure 15. After the corners of all cells or tufts are thus connected by the upholstery pins 59, the material of the outer sheet 63, at the edges of the tufts may be manually straightened or adjusted, if necessary, to improve the appearance of the work. This is more frequently required when the outer sheet 61 is formed of relatively stiff material such as leather.

The completed tufted cushion or work is now lifted from the apparatus, and the same may be applied to an article of furniture, such as the seat or back of a sofa, and the marginal edges of the cushion are secured in place upon the furniture by any conventional or preferred means. Tufts may be manually formed, in whole or in part, upon the marginal edge portions of the cushions, as may be found advantageous in the completion of the finished work.

The apparatus 25 may also be used in the practice of a slightly modified form of the method, and when so used, upholsterers' needles 66 and thread 67 are employed for securing fabric-covered buttons 68 in place at the corners of the cells or tufts 63. The upholsterers' pins 59 are omitted entirely in the practice of this form of the method.

Figure 17:
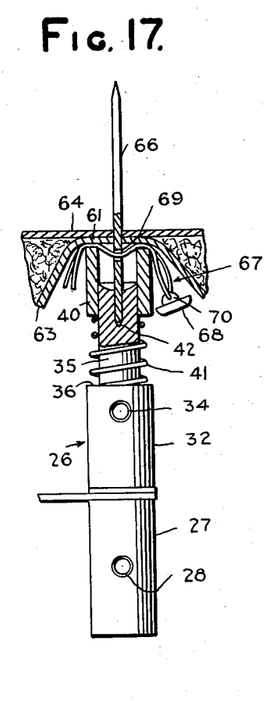
Figure 17 is an enlarged central vertical section, similar to Figure 5, and showing the apparatus in use during the practice of a second or modified form of the method.

The blunt ends of the needles 66 are inserted in the bores or sockets 42 of all legs 26 of the apparatus, and the points of the needles are directed upwardly and extend above the sleeves 40, Figure 17. With the sleeves 40 elevated, the eyes 69 of the needles are arranged substantially at the upper ends of the sleeves, as shown. The eyes 69 are threaded with the thread 67, and this thread is formed in loops passing through attaching eyes 70, carried by the backs of the buttons 68. Both strands of the loops of thread 67 are threaded through the eyes 69, and these strands may lay across the upper ends of the sleeves 40 as shown in Figure 17, with the buttons 68 hanging at one side of the legs 26.

Figure 18:
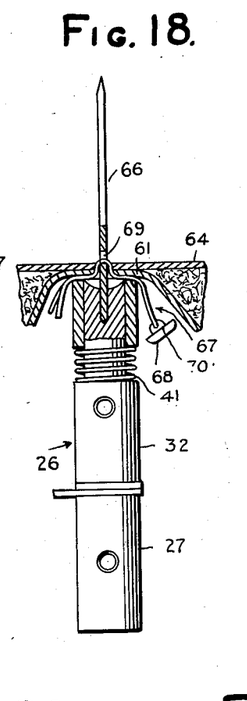
Figure 18 is a similar view illustrating another step in the practice of the second form of the method.
Figure 19:
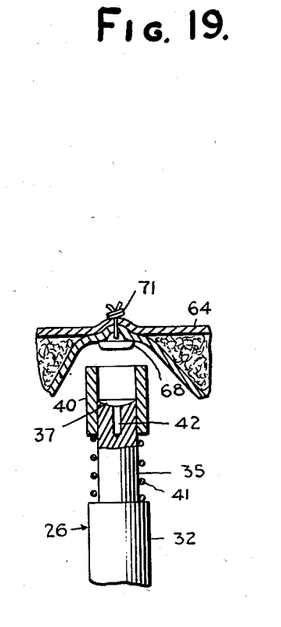
Figure 19 is a similar section showing a still further step in the practice of the second form of the method.
Figure 20:
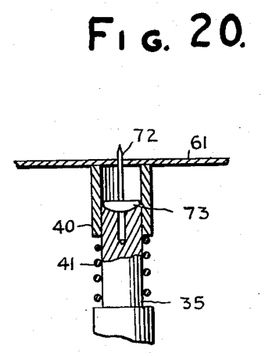
Figure 20 is a similar section through the apparatus and work, showing the use of the apparatus for practicing a further modification of the method.

The outer sheet 61 is now spread over the apparatus in the flat or distended condition, in the same manner described in connection with the first form of the method, and the points of the needles 66 pass through the sheet 61, but the eyes 69 do not pass through the sheet 61, while the sleeves 40 are elevated. The apparatus 25 is now collapsed in the identical manner described in connection with the first form of the method, and the cells or tufts 63 are formed and filled. The backing sheet 64 is applied over the outer sheet 61 in the manner previously described, and the sleeves 40 are depressed. The eyes 69 of the needles now pass upwardly through both sheets 61 and 64, Figure 18, and the needles 66 are grasped and withdrawn from the sockets 42, and pulled upwardly until the free ends of the thread 67 are pulled through and above the backing sheet 64. When this has been done, the strands of the thread 67 are pulled tight and tied in knots 71 above the backing sheet 64, Figure 19. The buttons 68 are now positioned against the outer sheet 61 at the corners of the tufts 63, and the buttons 68 assume the same positions at the buttons 60 shown in Figure 15. The thread 67 permanently secures the sheets 61 and 64 together in contacting relation at the four corners of the tufts 63, and thus serves the same purpose as the upholstery pins 59 used in the first form of the method. All other parts of the apparatus, with the exception of the needles 66 are identical to those shown and described in connection with the first form of the method, and the basic steps of the method are the same as those described previously in connection with the first form.

The apparatus 25 is also used in the practice of a further modification of the method. When this is done, upholsterers' brads or tack-buttons 72 having fabric-covered heads 73 are employed for securing the outer flexible sheet 61 to a substantially rigid backing panel or sheet 74 of plywood, fiber board or the like. The backing panel 74 is used instead of the flexible backing sheet 64 of the two prior forms of the method. The backing panel 74 may be of any desired thickness, such as one-half inch, and the brads 72 are of the proper length to penetrate the backing panel 74 without having their points pass entirely through the same. Neither the upholsterers' pins 59 nor the needles 66 are employed in the practice of this form of the method.

The heads 73 of the brads 72 are seated in the recesses 37, with the points of the brads projecting above the elevated sleeves 40. The outer sheet 61 is spread over the apparatus and pierced by the points of the brads 72, similarly to the manner in which the outer sheet is pierced by the upholstery pins 59 in Figure 10. The extended apparatus 25 is now collapsed or closed in the manner previously described, and the outer sheet 61 is held by the brads 62 so that the cells or pockets 63 are formed. These pockets are now filled in the manner described for forming the cushion tufts. The backing panel 74 is now placed over the apparatus and pressed downwardly against the points of the brads 72. The brads penetrate into the panel 74, and the sleeves 40 are depressed or lowered until the heads or buttons 73 contact the outer sheet 61 at the corners of the tufts 63. The brads 72 thus secure the tufted cushion to the backing panel 74 and the work may be lifted from the apparatus. All other parts of the apparatus are identical with those shown and described in connection with the first and second forms of the method.

Figure 21:
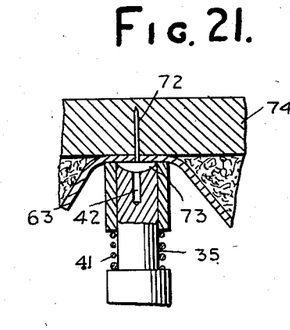
Figure 21 is a similar section showing an additional step in the practice of the third form of the method, and, Figure 22 is a plan view of the apparatus on a reduced scale, with the same shifted into a diamond shape for making diamond-shaped tufts during the practice of all forms of the method.
Figure 22:
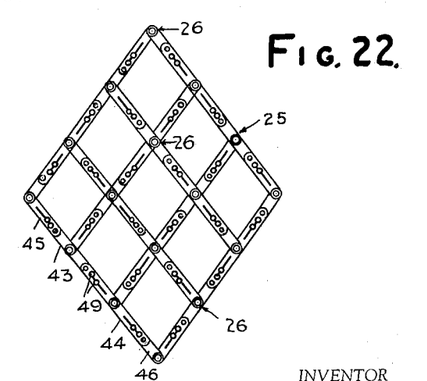

While the apparatus 25 has been shown and described throughout as rectangular or square, and the individual groups of legs forming the individual tufts 63 have also been described as rectangular, I wish to emphasize that due to the pivotal connections between the various connecting links and legs 26, the apparatus may be shifted into a diamond shape shown in Figure 21. This may be done when the apparatus has been initially extended, as in Figure 1, by grasping opposite corner legs 26 and pulling them apart. When the apparatus assumes the diamond shape shown in Figure 21, each group of four legs 26 likewise assumes a diamond shape. In this position, the apparatus 25 is manipulated in every other respect in the identical manner described in connection with the practice of the three forms of the method, and the completed tufts are formed diamond-shaped, rather than square or rectangular.

It is to be understood that the form of the apparatus herewith shown and described is to be taken as a preferred example of the same, and that various changes in shape, size and arrangement of parts may be resorted to, as well as variations in the method steps, without departing from the spirit of the invention or scope of the subjoined claims.

Having thus described my invention, I claim:

1. Apparatus for forming tufted work, comprising rows of substantially vertical legs, the legs in each row being spaced, the legs having their lower ends separate from and movably mounted upon a table top or the like, each leg being provided adjacent to its upper end with means for holding an element to be passed through sheet or sheets arranged upon such upper end, the rows of legs being arranged in groups which extend transversely of each other, a group of longitudinally extensible and contractable connecting elements pivotally connected with the legs to swing substantially horizontally with relation thereto, a group of longitudinally extensible and contractable connecting elements pivotally connected with said legs to swing substantially horizontally with relation thereto, the second group of connecting elements extending transversely of the first group of connecting elements, each connecting element being horizontally rigid and the connecting elements serving as the sole means of connection between said legs.

2. Apparatus for forming tufted work, comprising rows of substantially vertical legs, the legs in each row being spaced, the legs having their lower ends movably mounted upon a table top or the like, each leg being provided adjacent to its upper end with means for holding an element to be passed through sheet or sheets arranged upon such upper end, each leg having an intermediate reduced portion, first rows of links having openings formed therein for pivotally receiving the reduced portions of the legs, second rows of links having openings formed therein for pivotally receiving the reduced portions of the legs, the rows of links corresponding to the rows of legs and the rows of links being horizontally rigid and adapted to swing horizontally with relation to the legs, the links in each row being longitudinally adjustably connected so that the row is longitudinally extensible and contractable.

3. Apparatus for forming tufted work, comprising rows of substantially vertical legs, the legs in each row being spaced, the legs having their lower ends movably mounted upon a substantially horizontal support, each leg being provided adjacent to its upper end with means for holding an element to be passed through sheet or sheets arranged upon such upper end, the rows of legs being arranged in groups which extend transversely of each other, a group of longitudinally extensible and contractable connecting elements disposed substantially horizontally adjacent to said legs, each connecting element including links having openings formed therein to receive parts of the adjacent legs, a second group of longitudinally extensible and contractable connecting elements disposed substantially horizontally adjacent to said legs, each connecting element of the second group including links having openings formed therein to receive parts of the adjacent legs, each connecting element being substantially horizontally rigid.

4. Apparatus for forming tufted work, comprising rows of substantially vertical legs, the legs in each row being spaced, the legs having their lower ends movably resting upon a substantially horizontal support, each leg being provided adjacent to its upper end with means for holding an element to be passed through sheet or sheets arranged upon the upper end, the rows of legs being arranged in groups which extend transversely of each other, a group of longitudinally extensible and contractable connecting elements disposed substantially horizontally adjacent to said legs, each connecting element including adjustable links extending longitudinally of the connecting element, the links of each connecting element being attached to the legs in the adjacent row so that such legs move with the links when the links are longitudinally adjusted, a second group of longitudinally extensible and contractable connecting elements disposed substantially horizontally adjacent to said legs, each connecting element of the second group including adjustable links extending longitudinally of such connecting element, the links of each last-named connecting element being attached to the legs in the adjacent row so that such legs move with the links when the links are longitudinally adjusted.

WALTER A. HONEYCUTT.

REFERENCES CITED

The following references are of record in the file of this patent:

UNITED STATES PATENTS

| Number | Name | Date |
| --- | --- | --- |
| 777,019 | Hagedorn | Dec. 6, 1904 |
| 1,032,061 | Hildreth | July 9, 1912 |
| 1,042,663 | Freshel | Oct. 29, 1912 |
| 1,062,564 | Donegan | May 20, 1913 |
| 1,733,353 | Maulsby et al. | Oct. 29, 1929 |
| 1,931,202 | McRoskey | Oct. 17, 1933 |
| 1,974,052 | Lang | Sept. 18, 1934 |